United States Patent
Kleen et al.

(10) Patent No.: US 11,731,509 B2
(45) Date of Patent: Aug. 22, 2023

(54) METHOD FOR DISPLAYING THE COURSE OF A TRAJECTORY IN FRONT OF A TRANSPORTATION VEHICLE OR AN OBJECT BY A DISPLAY UNIT, AND DEVICE FOR CARRYING OUT THE METHOD

(71) Applicant: VOLKSWAGEN AKTIENGESELLSCHAFT, Wolfsburg (DE)

(72) Inventors: Andro Kleen, Braunschweig (DE); Michael Wittkämper, Braunschweig (DE); Robert Jan Wyszka, Hannover (DE); Vitalij Sadovitch, Braunschweig (DE)

(73) Assignee: Volkswagen Aktiengesellschaft

(*) Notice: Subject to any disclaimer, the term of this patent is extended or adjusted under 35 U.S.C. 154(b) by 279 days.

(21) Appl. No.: 16/766,349

(22) PCT Filed: Nov. 1, 2018

(86) PCT No.: PCT/EP2018/079957
§ 371 (c)(1),
(2) Date: May 22, 2020

(87) PCT Pub. No.: WO2019/105679
PCT Pub. Date: Jun. 6, 2019

(65) Prior Publication Data
US 2020/0376961 A1  Dec. 3, 2020

(30) Foreign Application Priority Data
Nov. 30, 2017 (DE) .................. 10 2017 221 488.0

(51) Int. Cl.
*B60K 35/00* (2006.01)
*B60W 40/02* (2006.01)

(52) U.S. Cl.
CPC ............ *B60K 35/00* (2013.01); *B60W 40/02* (2013.01); *B60K 2370/1529* (2019.05);
(Continued)

(58) Field of Classification Search
None
See application file for complete search history.

(56) References Cited

U.S. PATENT DOCUMENTS 5,559,511 A * 9/1996 Ito .................... G08G 1/096861
340/460
7,460,953 B2 * 12/2008 Herbst ............... G06Q 30/0251
701/438
(Continued)

FOREIGN PATENT DOCUMENTS

CN   104515531 A   4/2015
CN   105527709 A   4/2016
(Continued)

OTHER PUBLICATIONS

WayRay; WayRay Announces Partnership with Banma Invested by Alibaba to Develop AR enabled Car Navigation System; Mar. 14, 2017; downloaded from https://www.diorama.conn'2017/03/15/wayray-augment-reality-navigation-system-aiibaba/.
(Continued)

*Primary Examiner* — Jason A Pringle-Parker
(74) *Attorney, Agent, or Firm* — Barnes & Thornburg, LLP

(57) ABSTRACT

A method for displaying a trajectory course in front of a transportation vehicle or object. The trajectory course is shown on a display unit and is represented in grid format. The points of the grid are represented by symbols, wherein only the border thereof or the completely filled-in symbols are represented based on the environmental features. The size and/or color of the symbols is adjustable.

16 Claims, 6 Drawing Sheets

(52) U.S. Cl.
CPC .............. *B60K 2370/175* (2019.05); *B60K 2370/177* (2019.05); *B60K 2370/188* (2019.05)

(56) References Cited

U.S. PATENT DOCUMENTS

| | | | | |
|---|---|---|---|---|
| 7,751,958 | B2* | 7/2010 | Yoshiguchi | B62D 15/029 |
| | | | | 701/300 |
| 8,315,674 | B2* | 11/2012 | Lindner | G06T 19/006 |
| | | | | 455/566 |
| 8,346,426 | B1 | 1/2013 | Szybalski et al. | |
| 8,521,411 | B2* | 8/2013 | Grabowski | G01C 21/365 |
| | | | | 701/454 |
| 8,676,431 | B1 | 3/2014 | Mariet et al. | |
| 9,007,462 | B2* | 4/2015 | Mitsugi | G08G 1/168 |
| | | | | 348/148 |
| 9,041,741 | B2* | 5/2015 | Mabbutt | G02B 27/017 |
| | | | | 345/634 |
| 9,904,287 | B1* | 2/2018 | Kuffner, Jr. | G05D 1/0061 |
| 11,004,426 | B2* | 5/2021 | Bronder | G01C 21/365 |
| 2006/0004512 | A1* | 1/2006 | Herbst | G06Q 30/0241 |
| | | | | 701/431 |
| 2006/0287826 | A1* | 12/2006 | Shimizu | B60Q 9/007 |
| | | | | 701/431 |
| 2007/0118282 | A1 | 5/2007 | Yamamoto et al. | |
| 2008/0033633 | A1* | 2/2008 | Akiyoshi | G06Q 10/025 |
| | | | | 701/418 |
| 2008/0266389 | A1 | 10/2008 | DeWind et al. | |
| 2012/0008048 | A1* | 1/2012 | Sekine | G06T 19/006 |
| | | | | 348/565 |
| 2012/0059720 | A1* | 3/2012 | Musabji | G01C 21/3647 |
| | | | | 701/527 |
| 2012/0092369 | A1* | 4/2012 | Kim | G06T 19/006 |
| | | | | 345/633 |
| 2012/0299950 | A1* | 11/2012 | Ali | G06T 19/006 |
| | | | | 345/592 |
| 2014/0100994 | A1* | 4/2014 | Tatzel | G06Q 30/0276 |
| | | | | 705/27.1 |
| 2014/0132629 | A1* | 5/2014 | Pandey | G02B 27/0172 |
| | | | | 345/633 |
| 2016/0109701 | A1 | 4/2016 | Goldman-Shenhar et al. | |
| 2016/0133170 | A1* | 5/2016 | Fateh | G06F 3/04817 |
| | | | | 345/428 |
| 2016/0155268 | A1* | 6/2016 | Ko | G06T 19/006 |
| | | | | 345/633 |
| 2016/0284125 | A1* | 9/2016 | Bostick | G06F 3/012 |
| 2016/0350974 | A1* | 12/2016 | Hashimoto | G06F 3/14 |
| 2017/0336629 | A1 | 11/2017 | Suzuki et al. | |
| 2017/0343375 | A1* | 11/2017 | Kamhi | H04W 4/40 |
| 2018/0089899 | A1* | 3/2018 | Piemonte | G06T 15/506 |
| 2018/0178812 | A1* | 6/2018 | Kassner | G06V 20/20 |
| 2018/0265130 | A1 | 9/2018 | Derendarz et al. | |
| 2018/0348861 | A1* | 12/2018 | Uscinski | G06V 20/20 |
| 2019/0000578 | A1* | 1/2019 | Yu | G06T 19/006 |
| 2019/0182435 | A1* | 6/2019 | Nakayama | H04N 5/2628 |

FOREIGN PATENT DOCUMENTS

| | | |
|---|---|---|
| DE | 102005062151 A1 | 7/2007 |
| DE | 102007016868 A1 | 10/2008 |
| DE | 102011075887 A1 | 11/2012 |
| DE | 102012222380 A1 | 6/2014 |
| DE | 102013016251 A1 | 6/2014 |
| DE | 102013016242 A1 | 4/2015 |
| DE | 102016211184 A1 | 3/2017 |
| DE | 102016200136 A1 | 7/2017 |
| WO | 2005053991 A1 | 6/2005 |
| WO | 2005121707 A2 | 12/2005 |

OTHER PUBLICATIONS

Search Report for International Patent Application No. PCT/EP2018/079957; dated Apr. 8, 2019.

* cited by examiner

METHOD FOR DISPLAYING THE COURSE OF A TRAJECTORY IN FRONT OF A TRANSPORTATION VEHICLE OR AN OBJECT BY A DISPLAY UNIT, AND DEVICE FOR CARRYING OUT THE METHOD

PRIORITY CLAIM

This patent application is a U.S. National Phase of International Patent Application No. PCT/EP2018/079957, filed 1 Nov. 2018, which claims priority to German Patent Application No. 10 2017 221 488.0, filed 30 Nov. 2017, the disclosures of which are incorporated herein by reference in their entireties.

SUMMARY

Illustrative embodiments relate to the technical field of driver information systems, which are also known under the term infotainment system. In this case, this especially relates to a method for displaying a trajectory course in front of a transportation vehicle or an object having additional items of information. Such systems are used above all in transportation vehicles. However, the option also exists of using the illustrative embodiments in the case of pedestrians, bicyclists, etc. having data glasses. Illustrative embodiments furthermore relate to a correspondingly designed device for carrying out the method as well as a transportation vehicle and a computer program.

BRIEF DESCRIPTION OF THE DRAWINGS

Exemplary embodiments are illustrated in the drawings and are explained in greater detail hereafter on the basis of the figures, in which.

DETAILED DESCRIPTION

Figure 1:
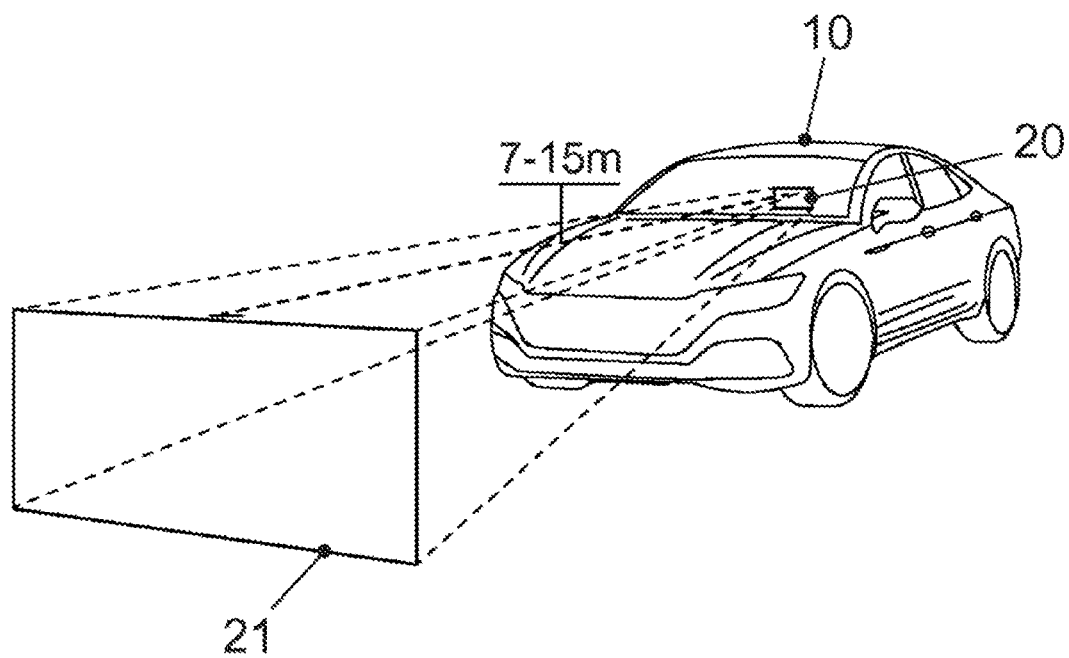
FIG. 1 shows the principle of overlaying items of information into the field of view of the driver of a transportation vehicle during driving with the aid of a head-up display.

Intensive work is presently being done on technologies which are later supposed to enable autonomous driving. A first approach in this case is not to relieve the driver completely from his tasks, but rather to enable the driver to be able to take over the control of the transportation vehicle at any time. In addition, the driver performs monitoring functions. By way of more recent technologies in the field of driver information systems, such as head-up display (HUD), it is possible to inform the driver better about the events in the surroundings of his transportation vehicle.

For the near future, it is therefore to be presumed that comprehensive items of information about objects (in particular, transportation vehicles) in the direct surroundings of the ego transportation vehicle will become available on the system side due to the use of more recent technologies (vehicle-to-vehicle communication, usage of databases, transportation vehicle sensors, etc.). In the field of transportation vehicle sensors, the following components are mentioned, in particular, which enable an environmental observation: RADAR devices, corresponding to radio detection and ranging, LIDAR devices, corresponding to light detection and ranging, primarily for the field of distance sensing/warning, and cameras having corresponding image processing for the field of object recognition. These data about the surroundings can therefore be used as the basis for system-side driving recommendations, warnings, etc. For example, displays/warnings are thus conceivable about the direction in which another nearby transportation vehicle wishes to turn off (possibly into the ego trajectory).

The vehicle-to-vehicle communication has also become possible in the meantime by mobile communication using systems such as LTE, corresponding to long-term evolution. A specification having the name LTE V2X has been adopted here by the organization 3GPP. As an alternative, systems based on WLAN technology are available for transportation vehicle direct communication, in particular, the system according to WLAN p.

The term "autonomous driving" is sometimes used differently in the literature.

Therefore, the following insert is presented here to clarify this term. Autonomous driving (sometimes also called automatic driving, automated driving, or piloted driving) is to be understood as the locomotion of transportation vehicles, mobile robots, and driverless transportation systems which behave substantially autonomously. There are various gradations of the term autonomous driving. In this case, at specific levels reference is also made to autonomous driving if a driver is still located in the transportation vehicle, who possibly only still assumes the monitoring of the automatic driving procedure. In Europe, the various transport ministries (in Germany the Federal Highway Research Institute participated) have cooperated and defined the following autonomy levels.

Level 0: "driver only", the driver drives himself, steers, accelerates, brakes, etc.

Level 1: specific assistance systems help in the transportation vehicle operation (inter alia, an automatic cruise control (ACC)).

Level 2: partial automation. Inter alia, automatic parking, lane keeping function, general longitudinal control, acceleration, braking, etc. are assumed by the assistance systems (inter alia, congestion assistant).

Level 3: high automation. The driver does not have to continuously monitor the system. The transportation vehicle independently carries out functions such as turning on the turn signal, lane change, and lane keeping. The driver can turn to other things, but is requested as needed within a pre-warning time by the system to assume the control. This form of autonomy is technically feasible on freeways. The legislators are working on permitting level 3 transportation vehicles. The legal framework conditions have already been provided for this purpose.

Level 4: full automation. The control of the transportation vehicle is continuously assumed by the system. If the driving tasks are no longer managed by the system, the driver can be requested to assume control.

Level 5: no driver required. Except for defining the destination and starting the system, human intervention is not required.

Automated driving functions from level 3 remove the responsibility for the control of the transportation vehicle from the driver.

Due to the present development toward higher autonomy levels, where many transportation vehicles are still controlled by the driver, however, it is to be presumed that accordingly additional items of information will already be able to be used in the moderate term for manually controlled transportation vehicles and not only in the long term for highly automated systems.

For the driver-vehicle interaction, the question arises in this case as to how these items of information can be displayed so that a real added value results for the human driver and he can also locate the provided items of information rapidly or intuitively, respectively. The following solutions in this field are already known from the prior art in this case.

A vision of the future in the automotive branch is to be able to play virtual elements on the windshield of the ego transportation vehicle to enable some benefits for the driver. The so-called "augmented reality" technology (AR) is used. The corresponding German-language concept of "expanded reality" is less common. In this case, the real environment is enriched with virtual elements. This has multiple benefits: Looking downward, at displays other than the windshield, is dispensed with, since many items of relevant information are depicted on the windshield. The driver thus does not have to look away from the roadway. Moreover, due to the accurately-positioned locating of the virtual elements in the real environment, less cognitive effort is probable on the part of the driver, since an interpretation of a graphic on a separate display does not have to be performed. An added value can also be created with respect to automatic driving.

Since the technological methods and mechanisms are presently correspondingly limited, it can be presumed that in the moderate term fully playable windshields will not be encountered in transportation vehicles. Therefore, presently head-up displays are used in the transportation vehicles. These displays are actually projection units, which project an image on the windshield. This image is located from a few meters up to 15 m in front of the transportation vehicle from the viewpoint of the driver, however, depending on the construction of the module.

The "image" is composed as follows in this case: This is less a virtual display here, but rather a type of "keyhole" into the virtual world. The virtual environment is theoretically laid over the real world and contains the virtual objects which assist and inform the driver while driving. The limited display area of the HUD has the result that only a portion of the real world can be played with HUD overlays. One thus looks through the display area of the HUD at the portion of the virtual world. Since these virtual surroundings supplement the real surroundings, in this case reference is also made to a "mixed reality".

A method for displaying a driving path course in front of a transportation vehicle is known from DE 10 2007 016 868 A1, wherein a present velocity of the transportation vehicle is determined. In this case, points of a transportation vehicle environment located in front of the transportation vehicle are determined so that an optical flow of these points is determined in consideration of the present transportation vehicle velocity, and symbols to represent the optical flow are overlaid in the head-up display to represent the roadway course.

A method and a system for assisting a path control method are known from WO 2005/053991 A1. The method and system are used for assisting the path control, in particular, of a transportation vehicle on a road or in a terrain environment or a ship or an aircraft. In this case, the method consists of carrying out at least one of the following operations (a) and (b): (a) estimating an actual future path of the transportation vehicle on the basis of transportation vehicle movement data and visual and/or acoustic and/or tactile display of the estimated actual future route to the driver, (b) detecting the actual present path of the transportation vehicle, estimating a present deviation of the detected actual present path from a desired present path and visual and/or acoustic and/or tactile display of the estimated present deviation to the driver.

A head-up display is known from DE 10 2011 075 887 A1, in which the ambient brightness is detected and the light intensity of the emitted light is adapted depending on the ambient brightness. The contrast ratio is also improved in the proposed head-up display.

A stereoscopic head-up display is known from DE 10 2012 222 380 A1, in which a photometric parameter of the display unit, such as the brightness and background color, is determined from the environment of the transportation vehicle, in particular, only based on the position of the transportation vehicle, an ascertained precipitation at the position of the transportation vehicle, an ascertained ambient temperature at the position of the transportation vehicle, an item of time information, and/or from at least one value of an external data source.

A method for operating a stereoscopic head-up display is known from DE 10 2016 200 136 A1, wherein the method comprises changing, in which an item of image information determined for the right eye and/or an item of image information determined for the left eye is changed based on a ratio or a difference between a crosstalk value, which represents a crosstalk between the item of image information determined for the right eye and that determined for the left eye, and a threshold value.

Overlaying a navigation route object, such as an overhead navigation cable, on a head-up display is known from WO 2005/121707. The overhead navigation cable is overlaid at a distance above the roadway. The overhead navigation cable can also be indicated by symbols arranged along the cable.

One significant benefit of the previously known "augmented reality" displays (AR displays) is representing the corresponding displays directly within and/or as a part of the surroundings. Relatively obvious examples usually relate to the field of navigation. While classic navigation displays (in conventional HUD) generally display schematic representations, for example, an arrow extending perpendicularly to the right as an indication that a right turn should be made at the next opportunity, AR displays offer substantially more effective options. Since the displays can be represented as "part of the environment", extremely rapid and intuitive interpretations are possible for the user. Nonetheless, the approaches heretofore known also have various problems, for which no solutions are known at the present point in time.

The known solutions are subject to various drawbacks. This has been recognized in the scope of the disclosure. In the known solutions, the problem exists that depending on environmental conditions, the representation of the driving direction course is either poorly recognizable or is too noticeable and distracts from the actual occurrences on the roadway.

The basic concept of the disclosed embodiments is to dispense with concealed areas and instead to fragment the display contents. An array of benefits is seen in this procedure, which, in addition to meeting the requirements of little coverage of the surroundings and sufficient error tolerance at the same time, is that the human perception apparatus is readily capable, because of requirements of evolutionary biology, of understanding the individual display elements as a coherent reference. The means of the selection for the visualization of the individual grid elements were simple white balls or points.

Moreover, two further facets of interest were shown with the present implementations in the transportation vehicle. On the one hand, with the use of the simple element form (white balls/points), it is only possible to achieve a limited amount of aesthetic value. On the other hand, the use of full-surface display elements results in a consistent brightness and thus perceptibility of the represented elements. For particularly bright surroundings (sunny day), this effect is entirely desirable. For darker environments (later time of day, heavy clouds, tunnel, etc.), undesirably high levels of visibility can occur here, however, which inadvertently result in drawing a high level of attention.

Moreover, it can occur that a sufficient level of brightness exists, but the "augmented reality" HUD elements are poorly visible due to heavy rain. Adaptation of the display elements is to be performed both in the case of difficult brightness conditions and also in the case of poor vision from other influences (for example, rain).

The demand thus exists for further improvements in the display of driving direction courses (navigation trajectories), which can be variably adapted, so that distractions of the driver cannot occur depending on environmental conditions.

Disclosed embodiments provide such an approach. Vice versa, the driving direction course is to be prevented from being displayed too weakly in specific environmental conditions, so that the driver can follow the course poorly.

This achieved by a method for displaying a course of a trajectory in front of a transportation vehicle or an object with the aid of a display unit, a device for carrying out the method, as well as a transportation vehicle and a computer program.

The disclosed solution is directed to adapting the representation to the environmental conditions. For this purpose, the environmental conditions are detected using the suitable sensors and the symbols used for the grid representation of the driving direction course (navigation path), such as a driving band or driving tube, are represented differently depending on the detected environmental condition. The driving direction course is overlaid as previously with the aid of a display unit in the field of view of the driver, wherein the course is again represented in grid form.

At least one disclosed embodiment consists of firstly using symbols for the representation of the grid points which only consist of the outline or border. This display option can be used, for example, more in dark environmental conditions, since the represented element parts enable sufficient visibility for the driver. The condition for this is the coupling to at least one sensor unit which establishes the environmental conditions. In the case of brighter environmental conditions, an adaptation of the representation of the symbols takes place up to a full-surface representation.

In addition, a coupling to sensor units and/or software modules is also to take place, which evaluate the vision conditions with regard to the AR displays.

In at least one disclosed embodiment, the ambient brightness comes into consideration as a parameter for evaluating the environmental condition.

In the case of lower ambient brightness, the points of the grid are represented using symbols, of which only the border is shown. In one example, these can be simple graphic symbols such as circles, balls, rectangles, cuboids, triangles, rods, etc. This has the benefit that the represented components of the symbols are sufficient to be perceived suitably by the driver.

In the case of high ambient brightness, the points of the grid are represented using symbols which are represented filled up over the full surface. This has the benefit that the symbols are emphasized more strongly, to be able to be better perceived by the driver in these environmental conditions. A continuous adaptation of the degree of filling of the symbols may take place between the two extreme values darkness and a high level of sunlight.

In a further disclosed embodiment, weather conditions, in particular, types of precipitation such as rain, heavy rain, snow, hail, or fog are analyzed as the environmental condition. The condition for this is the presence of a corresponding sensor system. Alternatively, a very accurate weather report can also be used, which is loaded, for example, via the Internet. Other weather conditions are also to be mentioned, such as wind speeds and temperature conditions, which can be taken into consideration.

In a further disclosed embodiment, in the event of rain and/or heavy rain, the points of the grid are represented using symbols which have a shape which can be better differentiated from rain, in particular, raindrops. For example, the use of a rectangular symbol shape comes into consideration here.

In addition, operating modes of the transportation vehicle determined as an environmental condition, such as engine settings, chassis settings, and driver assistance settings, can be analyzed. In the case of a "sport" setting, for example, triangles could be used as symbols, in the case of a "normal" setting, rectangular symbols, and in the case of an "eco" setting, circular symbols.

Furthermore, in a further disclosed embodiment, the size and/or the color of the symbols are also varied depending on the environmental condition. It would thus be beneficial, for the above-mentioned operating mode settings "sport", "normal" and "eco", to also adopt the color in addition to the shape of the symbols. For example, the color red could be used for the "sport" mode and accordingly the color blue or black for the "normal" mode and the color green for the "eco" mode.

In a further disclosed embodiment, the roadway composition and/or the roadway environment and/or the traffic situation is detected and analyzed as an environmental condition. Various types come into consideration as the roadway composition. In the case of specific types of paving such as cobblestone paving, for example, it can be beneficial to use differing shapes of the grid symbols. Other roadway compositions are concrete, various types of asphalt such as silent asphalt, forest and field paths, etc. If many potholes are present on the roadway, an adaptation should also take place. The potholes should be well recognizable, so that the driver can avoid them. An adaptation of the symbols could also be performed if a variety of line markings (for example, shading in the case of blocked areas) are provided on the roadway.

In general, this relates to dynamically adapting the adaptation of the grid symbols to the environmental conditions. Adaptations would also come into consideration for the roadway environment and the traffic situation. If the transportation vehicle is moving in an urban environment, where the environment corresponds more to a gray tone, an accentuation can be achieved by changing the color to yellow, blue, green for the grid symbols. In the case of a more colorful rural environment, the grid symbols can remain more in gray tones or other monochromatic tones. The roadway environment would thus be analyzed here. If many transportation vehicles are underway on the roadway, for example, on a freeway having very many passenger transportation vehicles or trucks, and the brake lights light up when approaching the end of a traffic jam, a color other than red should be selected for the grid symbols in any case. The traffic situation would thus be evaluated as an environmental condition here.

The disclosed embodiments can also be used if the display unit corresponds to data glasses. The disclosed method may then be used even in the case of pedestrians, bicyclists, motorcyclists, etc.

In the transportation vehicle, the disclosed embodiments may be implemented so that the display unit is permanently installed in the transportation vehicle, for example, a head-up display. Nonetheless, one possible implementation would also be possible with the aid of data glasses if the use of the data glasses were permitted in the case of the driver in future.

For a device for carrying out the method, it is beneficial if it comprises a display unit, using which virtual items of additional information can be overlaid into the field of view of the driver or the operator of the object. This is provided in the case of a head-up display and also in the case of data glasses. Furthermore, this device is to comprise a processing unit and the processing unit is to compute a grid in such a manner that it computes the grid points so that they are located on grid lines, by which the trajectory course is indicated, wherein the processing unit selects symbols for the points of the grid, of which only the border or the completely filled symbols are represented depending on the environmental condition.

It is beneficial in this case if the processing unit either converts the selected symbols to be able to represent only the border up to completely filled symbols depending on the environmental condition or selects correspondingly precomputed and stored symbols for the representation depending on the environmental condition.

It is particularly beneficial if the device contains a display unit which is embodied as a head-up display.

Instead of a head-up display, data glasses or a monitor can be used as a display unit in the device, on which a camera image is displayed, in which a trajectory course is overlaid.

The disclosed device can be used in a transportation vehicle.

The corresponding benefits as described for the disclosed method apply for a computer program which is to be executed in the processing unit of the device to carry out the disclosed method.

The present description illustrates the principles of the disclosure. It is therefore obvious that persons skilled in the art will be capable of conceiving various arrangements, which are not explicitly described here, but embody principles of the disclosure and are also to be protected within its scope.

FIG. 1 illustrates the functional principle of a head-up display. The head-up display 20 is attached in the transportation vehicle 10 behind the dashboard paneling. Additional items of information are overlaid into the field of view of the driver by projection on the windshield. These additional items of information appear as if they were projected on a projection surface 21 at a distance of 7-15 m in front of the transportation vehicle 10. However, the real world remains visible through this projection surface 21. A quasi-virtual environment is generated using the overlaid additional items of information. The virtual environment is theoretically laid over the real world and contains the virtual objects which assist and inform the driver while driving. However, it is only projected onto a part of the windshield, so that the additional items of information cannot be arranged arbitrarily in the field of view of the driver.

Figure 2:
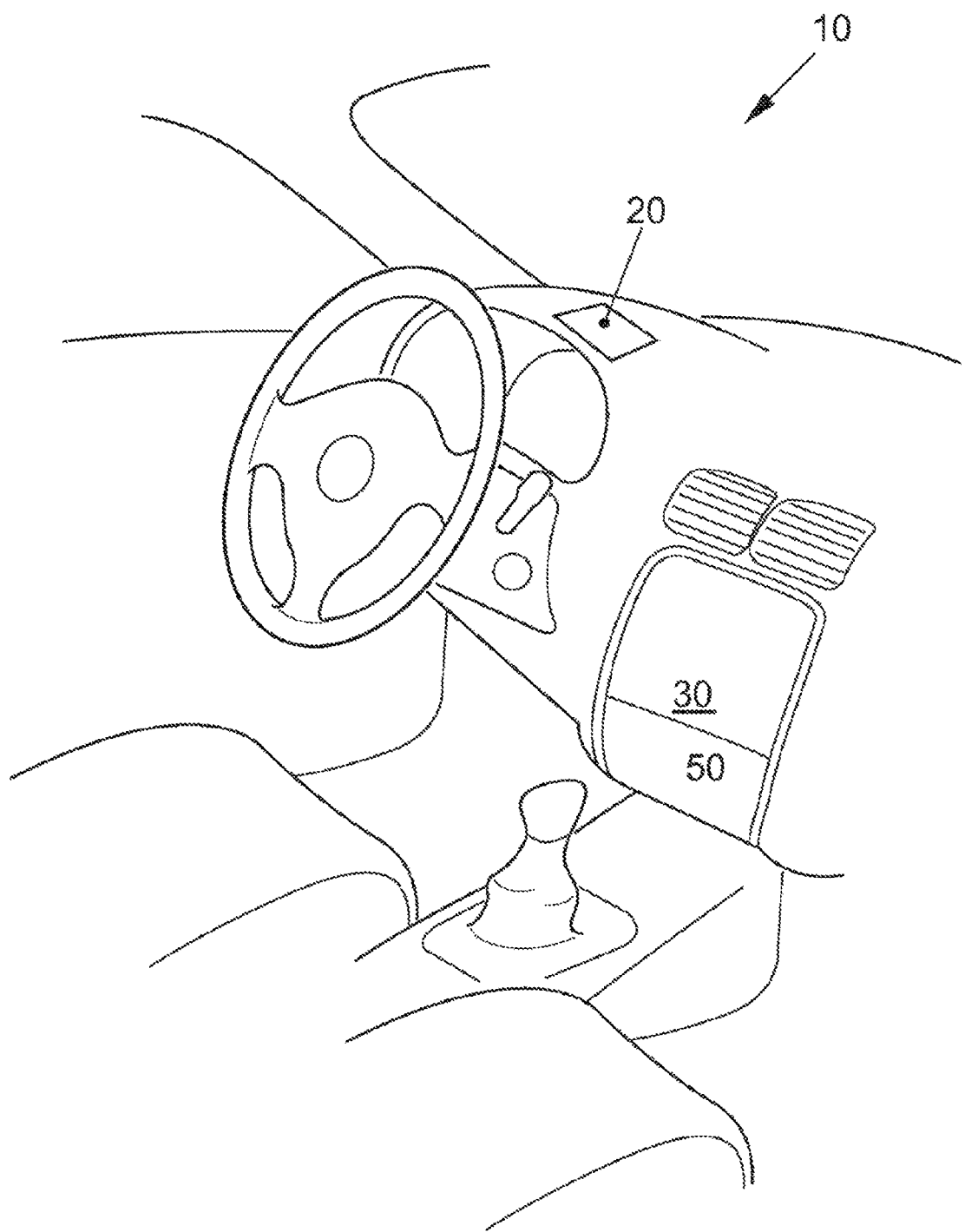
FIG. 2 shows the typical cockpit of a transportation vehicle.

FIG. 2 shows the cockpit of the transportation vehicle 10. A passenger transportation vehicle is shown. However, any arbitrary other transportation vehicles would also come into consideration as the transportation vehicle 10. Examples of further transportation vehicles are: buses, utility vehicles, in particular, trucks, agricultural machines, construction machines, rail vehicles, etc. The use of the disclosed embodiments would generally be usable in land transportation vehicles, rail transportation vehicles, water transportation vehicles, and air transportation vehicles.

Three display units of an infotainment system are shown in the cockpit. These are the head-up display 20 and a touch-sensitive display screen 30, which is attached in the center console. While driving, the center console is not in the field of view of the driver. Therefore, the additional items of information are not overlaid on the display unit 30 while driving.

The touch-sensitive display screen 30 is used in this case for operating functions of the transportation vehicle 10. For example, a radio, a navigation system, a playback of stored pieces of music, and/or a climate control system, other electronic devices, or other comfort functions or applications of the transportation vehicle 10 can be controlled via this. This is frequently referred in summary to an "infotainment system". In transportation vehicles, especially passenger transportation vehicles, an infotainment system refers to the combination of car radio, navigation system, hands-free system, driver assistance systems, and further functions in a central operating unit. The term infotainment is a portmanteau word composed of the words information and entertainment. The touch-sensitive display screen 30 ("touchscreen") is primarily used to operate the infotainment system, wherein this display screen 30 can be seen and operated well by a driver of the transportation vehicle 10, but also by a front passenger of the transportation vehicle 10. Moreover, mechanical operating elements, for example, buttons, rotary controllers, or combinations thereof, such as push-turn controllers, can be arranged below the display screen 30.

Figure 3:
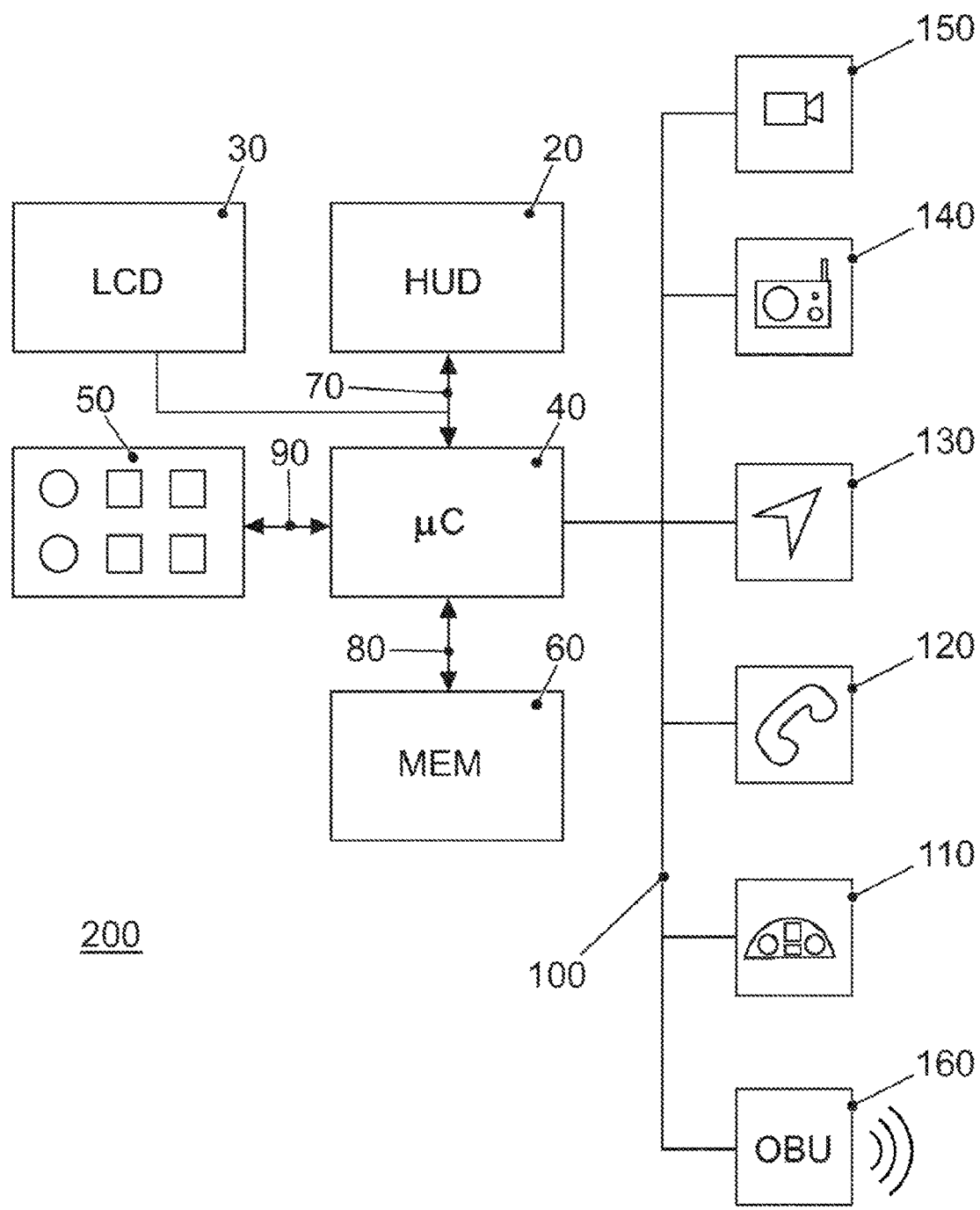
FIG. 3 shows the block diagram of the infotainment system of the transportation vehicle.

FIG. 3 schematically shows a block diagram of the infotainment system 200 and also, by way of example, several subsystems or applications of the infotainment system. The operating device comprises the touch-sensitive display unit 30, a processing unit 40, an input unit 50, and a memory 60. The display unit 30 comprises both a display surface for displaying variable graphic items of information and also an operating interface (touch-sensitive layer) arranged over the display surface for the input of commands by a user.

The display unit 30 is connected via a data line 70 to the processing unit 40. The data line can be designed according to the LVDS standard, corresponding to low-voltage differential signaling. The display unit 30 receives control data for controlling the display surface of the touch screen 30 from the processing unit 40 via the data line 70. Control data of the input commands are also transferred from the touch screen 30 to the processing unit 40 via the data line 70. An input unit is identified by the reference sign 50. The above-mentioned operating elements such as buttons, rotary controllers, slide controllers, or push-turn controllers are associated therewith, with the aid of which the operator can make inputs via the menu guide. Input is understood in general as choosing a selected menu option, and also changing a parameter, switching a function on and off, etc. A steering wheel operation of parts of the infotainment system is typically also possible. This unit is not shown separately, but rather is considered to be part of the input unit 50.

The memory unit 60 is connected via a data line 80 to the processing unit 40. A pictogram list and/or symbol list is stored in the memory 60, having the pictograms and/or symbols for the possible overlays of additional items of information.

The further parts of the infotainment system, camera 150, radio 140, navigation device 130, telephone 120, and instrument cluster 110, are connected via the data bus 100 to the device for operating the infotainment system. The high-speed option of the CAN bus according to ISO standard 11898-2 comes into consideration as the data bus 100. Alternatively, the use of a bus system based on ethernet technology, such as BroadR-Reach, would also come into consideration, for example. Bus systems in which the data transfer takes place via optical fibers are also usable. The MOST bus (media-oriented system transport) or the D2B bus (domestic digital bus) are mentioned as examples. It is also mentioned here that the camera 150 can be designed as a conventional video camera. In this case, it records 25 full images/s, which corresponds in the interlace recording mode to 50 half images/s. Alternatively, a special camera can be used, which records more images/s, to increase the accuracy of the object recognition in the case of more rapidly moving objects. Multiple cameras can be used for environmental observation. In addition, the above-mentioned RADAR or LIDAR systems could additionally or alternatively also be used to carry out or expand the environmental observation. The transportation vehicle 10 is equipped with a communication module 160 for the internal and external wireless communication. This module is often also referred to as an onboard unit. It can be designed for mobile wireless communication, for example, according to the LTE standard, corresponding to long-term evolution. It can also be designed for WLAN communication, corresponding to wireless LAN, whether for communication with devices of the occupants in the transportation vehicle or for the vehicle-to-vehicle communication, etc.

The disclosed method for displaying a trajectory course in front of a transportation vehicle or an object with the aid of a display unit will be explained hereafter on the basis of several exemplary embodiments. In this case, the driving direction course in front of a transportation vehicle is used as an example of a trajectory course.

For the further figures, identical reference signs identify identical fields and symbols as explained in the description of FIGS. 1 to 3.

As described above, the foundation of the disclosed display of the driving direction course is a virtual grid, which is represented at a distance above the actual real environment. The real environment corresponds to the real roadway course. The grid may be projected so that it appears to the driver as if the grid were located at a distance of a few centimeters above the roadway. The distance can vary in this case depending on the embodiment.

Figure 4:
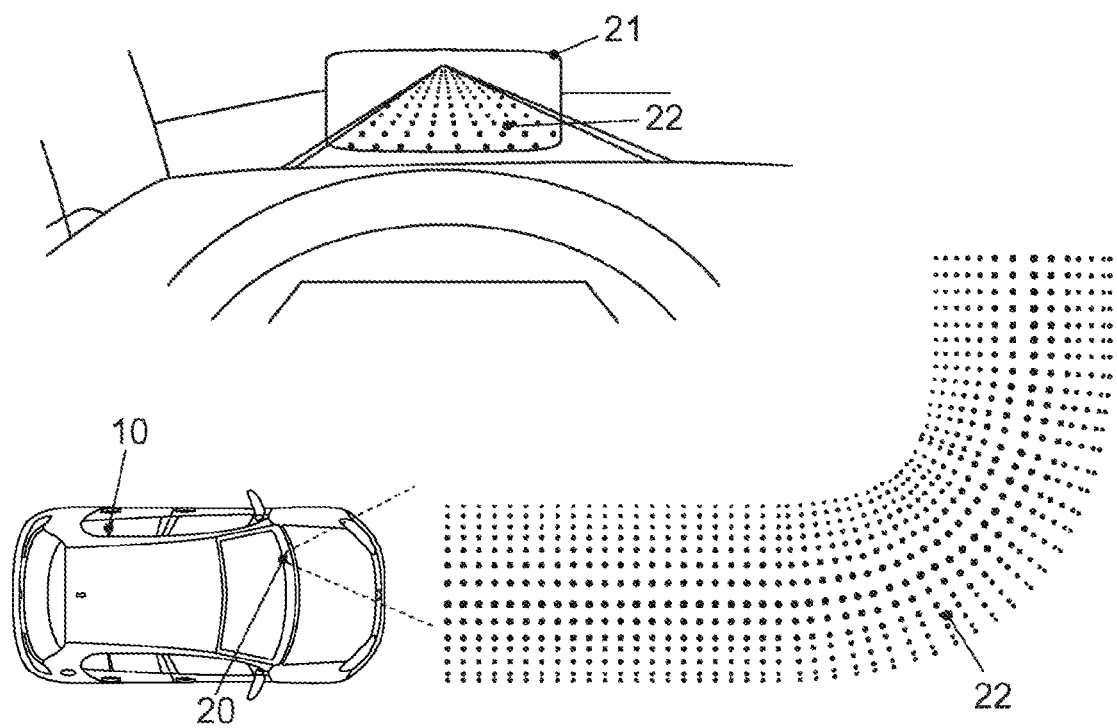
FIG. 4 shows two illustrations of driving direction courses, once on a straight section and once when driving through a curve.

FIG. 4 shows a first option of how the driving direction course can be displayed according to the disclosure. The driving direction course is typically displayed as a navigation route in the context of the navigation function of the navigation system 130 of the transportation vehicle 10. The path is thus marked which leads the transportation vehicle 10 to the input destination. In the dark, the display of the driving direction can also be overlaid independently of an input destination to assist the driver. In this case, the roadway course would thus be displayed. This helps the driver, since he can then already recognize earlier which curve or turnoff comes next. The representation of the driving direction course takes place in this example with the aid of a point grid 22. The point grid 22 may extend over the width of the lane on which the transportation vehicle 10 is moving. In this case, the type of the representation is selected in this example so that the points in the middle region 23 are emphasized more strongly than the points at the edges of the lane. In the example shown in FIG. 4, the emphasized points are highlighted by bolding. Due to the emphasis of the points in the middle lane region, the impression of a line is strengthened with the driver, as he is also otherwise familiar with from navigation systems. This utilizes the above-described capability of human perception, according to which the brain automatically completes fragmented patterns.

Figure 5:
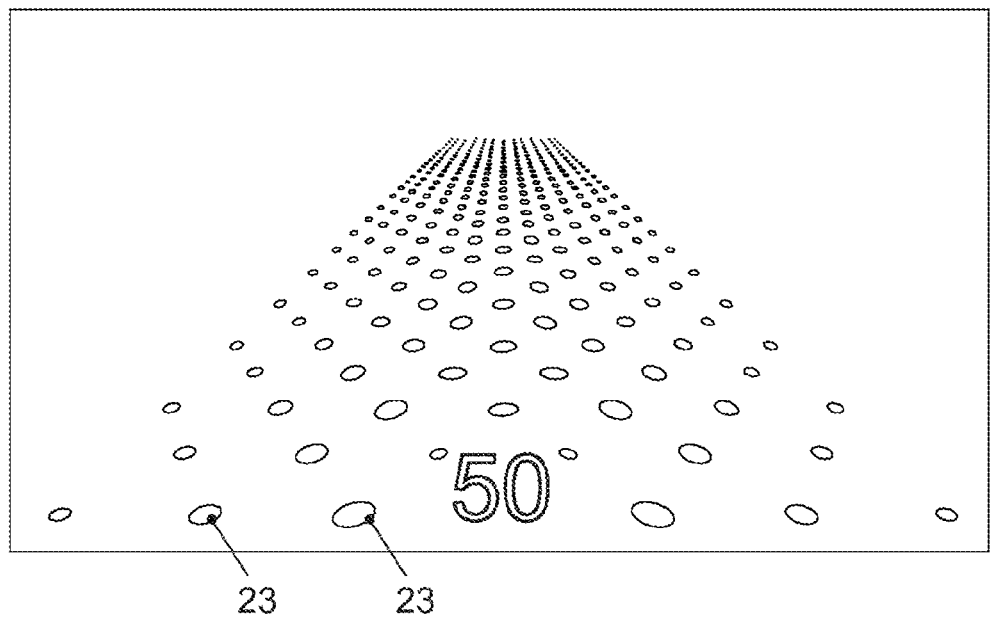
FIG. 5 shows an illustration of a driving direction course according to a first exemplary embodiment.

A first option of the representation of the driving direction course is shown in FIG. 5, which is beneficial for use in rather dark environmental conditions. Instead of the full-surface representation of the points of the grid 22, using which the driving direction course is displayed, only the border of the symbols 23, using which the grid points are marked, is displayed. In these dark environmental conditions, the components shown here in white are sufficient to be suitably perceived by the driver. Circles are used as symbols in this option. The overlay of the number "50" indicates the present transportation vehicle velocity.

If the ambient brightness increases, the symbols 23 of the grid 22 are highlighted increasingly more strongly. This is performed by filling up the symbols from the edge. This can take place continuously, but does not have to. A finely-graded filling would also come into consideration as an option.

Figure 6:
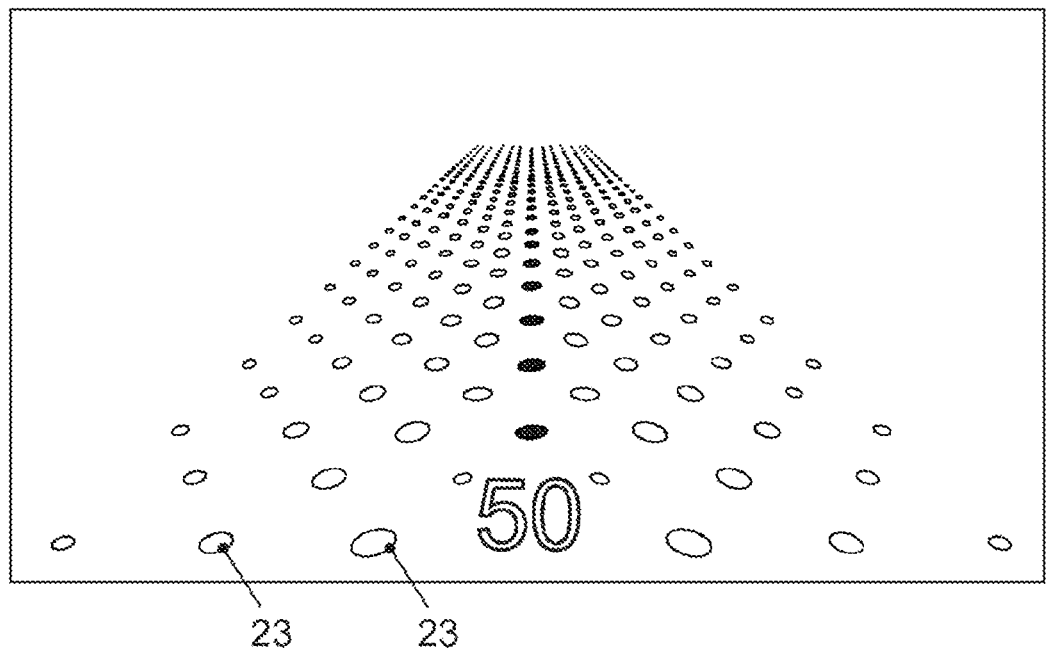
FIG. 6 shows an illustration of a driving direction course according to a second exemplary embodiment.

The stage is shown in FIG. 6 where full-surface filling of the symbols 23 is achieved. This representation is typically selected in full daylight with sunshine. If the filling of the symbols takes place continuously, the computation of the degree of filling can take place based on the brightness conditions.

An exemplary computation of the degree of filling FG based on the ambient brightness UH is presented as follows.

The minimal ambient brightness, at which the border is represented just as in FIG. 5, is UHmin. Accordingly, the ambient brightness in full daylight is UHmax. If the degree of filling of the symbols in the representation in minimal ambient brightness is FGR, the degree of filling FG of the symbols at a measured brightness value UH is then computed according to the formula:

$$FG = FG_R * \frac{UH}{UH_{min}},$$

wherein the infotainment system has to be calibrated so that $$\frac{UH_{max}}{UH_{min}} = \frac{1}{FG_R}$$

applies.

It is also conceivable that the degree of filling for the minimal setting FGR is settable by the driver.

In further disclosed embodiments, additional adaptations are performed. In a first expansion, the expansion relates to other difficult light conditions.

Figure 7:
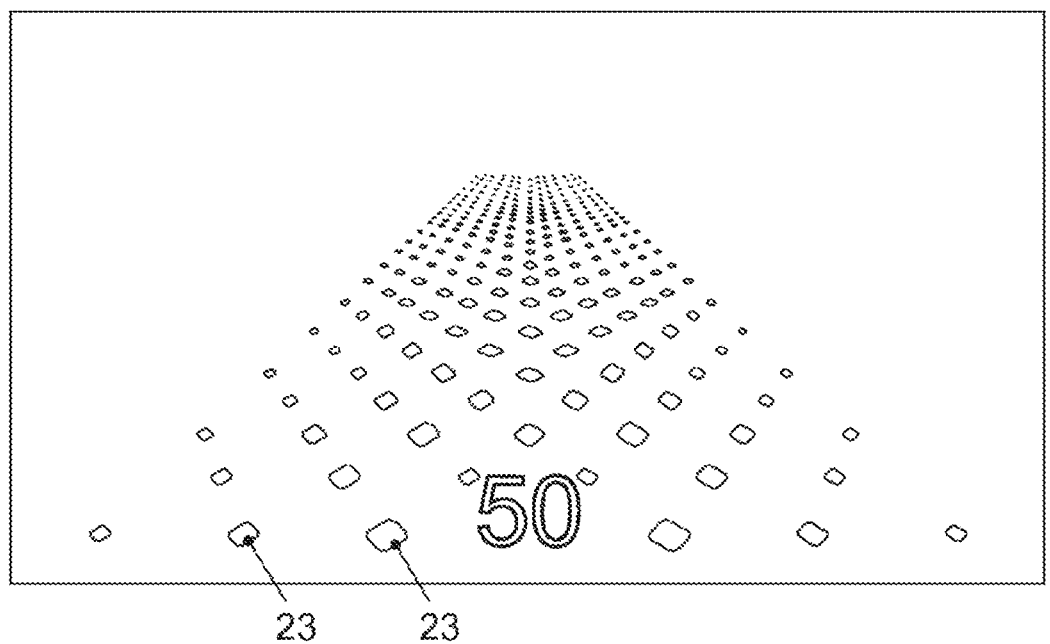
FIG. 7 shows an illustration of a driving direction course according to a third exemplary embodiment.

If other types of difficult vision conditions exist, the adaptive procedure is moreover related to the shape of the symbols 23. In the case of heavy rain, for example, the use of round grid symbols 23 can be omitted and the shape can be changed to more polygonal symbols 23. The benefits of the adaptation of the grid symbols 23 based on environmental conditions is also an optimized perceptibility of the AR-HUD display elements. The representation of the driving direction course using polygonal grid symbols is shown in FIG. 7. If environmental conditions should exist which preclude the use of specific shapes or cause them to appear inappropriate (for example, heavy rain or a specific underlying surface of the road), the shape of the elements is to be adapted in a running manner. In this representation, rectangular elements are shown instead, which can originate from the round elements. The condition for this is that a correspondingly accurate sensor system is provided in the transportation vehicle. Rain sensors are presently no longer special equipment in transportation vehicles and can fulfill this purpose. Alternatively, an indirect detection would also come into consideration. For example, if the speed of the wiper motor is detected and analyzed, the information about the strength of the rain can also be obtained. Image analysis methods using cameras would also come into consideration as an alternative. The shape of the grid symbols would then have to be updated at short time intervals, because the precipitation situation can change rapidly while driving.

In addition, a change could also be performed if specific changes in the operating mode occur on the part of the transportation vehicle (for example, the selection of a sport program). In modern transportation vehicles, such settings have effects on the entire drive system, i.e., engine, transmission, and suspension. The operating mode is often displayed to the driver on a display unit in the instrument cluster 110. The expansion consists here of a display also being performed via the head-up display 20. In one design, different grid symbols 23 were used in each case depending on the driving mode.

In the driving program "sport", for example, triangles directed forward could be used as the grid symbols 23. In the driving program "normal", rectangular systems could be used. In the driving program "eco", circle symbols could be used. In addition, a color design of the grid symbols could ensure better recognizability of the meaning of the symbols. The symbols for the "sport" mode would receive the color red. The symbols for the "normal" mode would receive the color blue or white. The symbols for the "eco" mode would receive the color green or blue.

Figure 8:
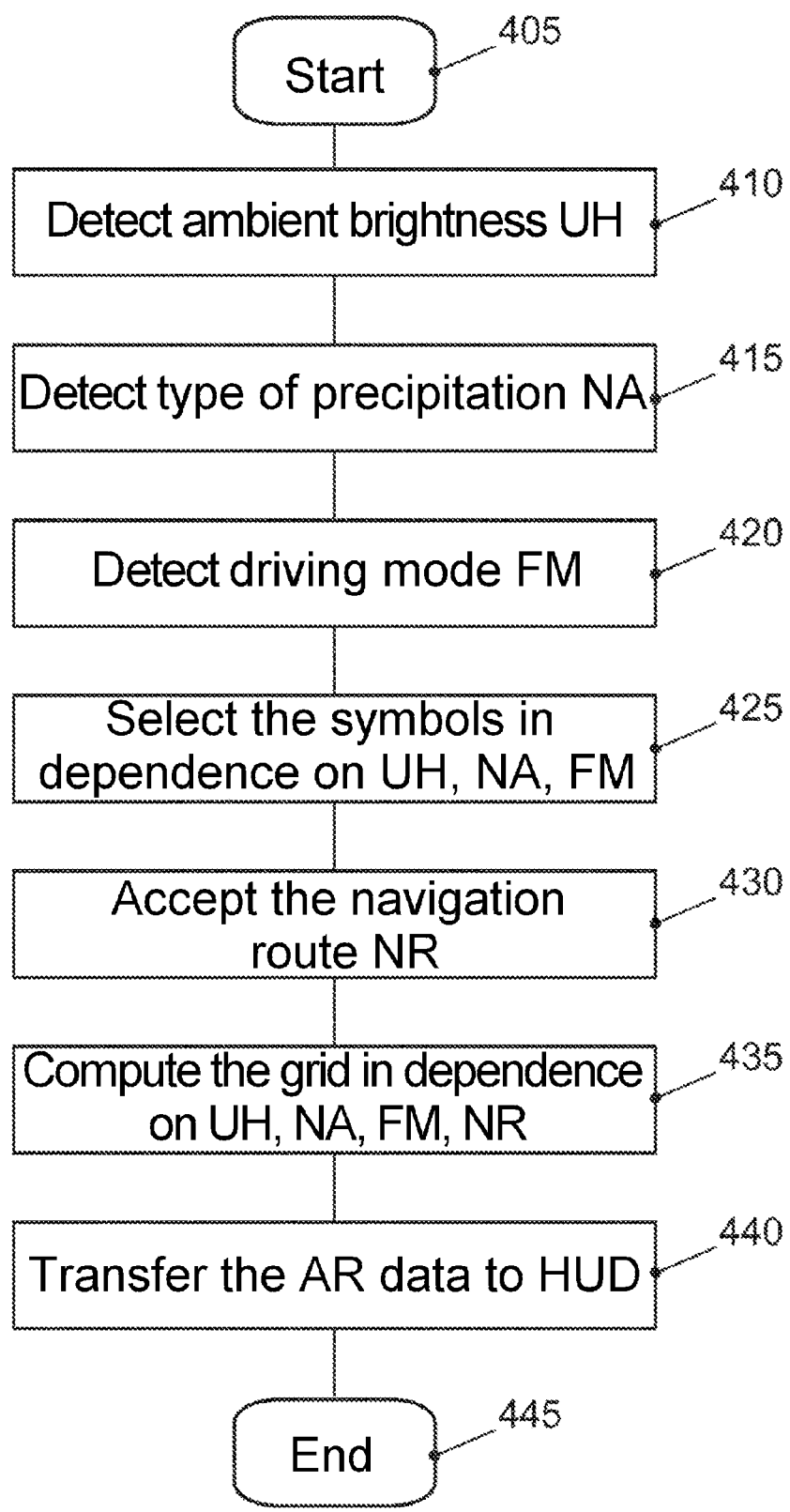
FIG. 8 shows a flow chart for a program for computing the overlay of a grid to display the driving direction course according to an exemplary embodiment.

The sequence of a program which is executed in the processing unit 40 to carry out the disclosed method is now shown in FIG. 8.

The program start is identified by the reference sign 405. In program operation at 410, the ambient brightness UH is detected for the transportation vehicle 10. A dedicated brightness sensor can be provided for this purpose in the cockpit. However, brightness sensors are often already installed in other components. The instrument cluster 110 and the touch-sensitive display screen 30 are mentioned as examples. The measured brightness values would be transferred via the bus systems 100 and 70 into the processing unit 40. Another type of the detection of the ambient brightness can also be performed by image analysis of the image recorded by the camera 150. In program operation at 415, the type of precipitation and/or precipitation strength NA are detected. This can be performed as already described, using rain sensor, speed of the wiper motor, or also by an image analysis method and camera 150. In following operation at 420, the set driving mode FM is detected. The setting is stored in any case in the processing unit 40 in a corresponding register point. The value at the register point is read out in this operation. The selection of the grid symbols 23 is then performed based on the detected parameters UH, NA, FM. The pictograms for the symbols are entered in a table, which is stored in the memory 60. A plurality of pictograms can be stored there, for example, for the various degrees of filling in the case of a finely-graded graduation. Finished symbols can thus already be retrieved having the desired degree of filling without having to convert them. Subsequently, the acceptance of the navigation route from the navigation system 130 in the processing unit 40 takes place in program operation at 430. The computation of the grid 22 for the overlay on the head-up display 20 having the selected symbols 23 for the planned navigation route then takes place in operation at 435. The way in which this operation is executed is known from the corresponding computation methods of the known navigation systems. Finally, the data for the overlay of the grid 22 are transferred in operation at 440 to the head-up display 20. This then overlays the computed grid 22 into the field of view of the driver. The program ends in program operation at 445.

All examples mentioned herein and also limited formulations are to be understood without restriction to such specially listed examples. Thus, for example, it is recognized by those skilled in the art that the block diagram illustrated here represents a conceptual view of an exemplary circuit arrangement. In a similar manner, it is to be recognized that an illustrated flow chart, state transition diagram, pseudo-code, and the like represent different options to represent processes which are essentially stored in computer-readable media and can thus be executed by a computer or processor. The object mentioned in the patent claims can expressly also be a person.

Another environmental condition, which can also be the reason for an adaptation of the grid symbols, can be, for example, the roadway underlying surface. In the case of specific types of paving such as cobblestone paving, for example, it can be beneficial to use differing shapes of the grid symbols. However, this also applies to other roadway compositions (concrete, different types of asphalt such as silent asphalt, forest and field paths, etc.). If many potholes are present on the roadway, an adaptation should also take place. The potholes should be well recognizable, so that the driver can avoid them. An adaptation of the symbols could also be performed if a variety of line markings (for example, shading in the case of blocked areas) are provided on the roadway.

In general, this relates to dynamically adapting the adaptation of the grid symbols to the environmental conditions. If the transportation vehicle is moving in an urban environment, where the environment corresponds more to a gray tone, an accentuation can be achieved by changing the color to yellow, blue, green for the grid symbols. In the case of a more colorful rural environment, the grid symbols can remain more in gray tones or other monochromatic tones. The roadway environment would thus be analyzed here. If many transportation vehicles are underway on the roadway, for example, on a freeway having very many passenger transportation vehicles or trucks, and the brake lights light up when approaching the end of a traffic jam, a color other than red should be selected for the grid symbols in any case. The traffic situation would thus be evaluated as an environmental condition here. The adaptation should take place as dynamically as possible. In a simpler option, the adaptation because of the roadway environment would be predetermined by the navigation route and would be rather static in this regard.

It is to be understood that the proposed method and the associated devices can be implemented in various forms of hardware, software, firmware, special processes, or a combination thereof. Special processors can comprise application-specific integrated circuits (ASICs), reduced instruction set computer (RISC), and/or field-programmable gate arrays (FPGAs). The proposed method and the device may be implemented as a combination of hardware and software. The software may be installed as an application program on a program storage device. This is typically a machine based on a computer platform, which comprises hardware, for example, one or more central processing units (CPU), a random access memory (RAM), and one or more input/output (I/O) interface(s). Moreover, an operating system is typically installed on the computer platform. The various processes and functions which were described here can be part of the application program or a part which is executed via the operating system.

The disclosure is not restricted to the exemplary embodiments described here. There is room for various adaptations and modifications, which a person skilled in the art would also consider to be associated with the disclosure due to his knowledge in the art.

The disclosure is explained in greater detail in the exemplary embodiments on the basis of the example of the usage in transportation vehicles. The application can also be of particular interest for the field of emergency transportation vehicles of fire departments, physicians, police, catastrophe protection, etc., to assist the emergency personnel in this case in finding persons in need of help particularly rapidly or to avoid risks. The possible use in aircraft and helicopters, for example, during landing maneuvers or search actions, etc., is also noted here. However, it is to be noted that the usage is not restricted thereto. The disclosed embodiments can be used whenever the field of view of a driver, an operator, or also simply a person having data glasses can be augmented using AR overlays.

AR overlays can also facilitate the operation in the case of remote-controlled devices such as robots, in which the remote control takes place via a monitor on which a camera image is reproduced. A possible usage thus also exists here.

LIST OF REFERENCE SIGNS 10 transportation vehicle
20 head-up display HUD
21 virtual projection surface
22 grid
23 grid symbol
30 touch-sensitive display unit
40 processing unit
50 input unit
60 memory unit
70 data line to the display unit
80 data line to the memory unit
90 data line to the input unit
100 data bus
110 instrument cluster
120 telephone
130 navigation device
140 radio
150 camera
160 communication module
200 infotainment system
405-445 various program operations

The invention claimed is:

1. A method for displaying the course of a trajectory in front of a transportation vehicle or an object with the aid of a display unit, the method comprising:
overlaying the trajectory in the field of view of the driver or the object, wherein the trajectory course is represented as a grid of points, and wherein the points of the grid are represented using symbols, of which only the border or the completely filled symbols are selected and displayed by a processing unit based on environmental conditions including an ambient brightness level;
detecting and analyzing the environmental conditions; and
adapting whether the displayed symbols are completely filled or displayed with only the border based on the analysis of the environmental conditions including the ambient brightness level,
wherein, filled symbols are displayed in response to detection of a higher ambient brightness level than a previously detected ambient brightness level.

2. The method of claim 1, wherein, only the border of displayed symbols is displayed in response to a detection of a lower ambient brightness level than a previously detected ambient brightness level.

3. The method of claim 1, further comprising detecting and analyzing precipitation as an environmental condition.

4. The method of claim 3, further comprising, in response to detection of rain and/or heavy rain, representing the points of the grid using symbols having a shape which is differentiated from rain.

5. The method of claim 4, wherein the shape of the displayed symbols is rectangular.

6. The method of claim 1, further comprising detecting and analyzing specific operating modes of the transportation vehicle as an environmental condition.

7. The method of claim 1, further comprising detecting and analyzing the roadway composition and/or the roadway environment and/or the traffic situation as an environmental condition.

8. The method of claim 1, wherein the size and/or the color of the symbols is varied based on environmental conditions.

9. The method of claim 1, wherein the object is a pedestrian and the display unit corresponds to data glasses.

10. A device for displaying the course of a trajectory in front of a transportation vehicle or an object, the device comprising:
a display unit, using which virtual items of additional information are overlaid in the field of view of the driver or the operator of the object;
a processing unit; and
one or more components for detecting environmental conditions,
wherein the processing unit computes a grid for the display of a the trajectory course,
wherein the processing unit selects corresponding pre-computed and stored symbols for the points of the grid,
wherein the points of the grid are represented using symbols, of which only the border or the completely filled symbols are selected and displayed by a processing unit based on environmental conditions including an ambient brightness level, wherein the environmental conditions are detected and analyzed, and wherein the displayed symbols are completely filled or displayed with only the border based on the analysis of the environmental conditions including the ambient brightness level, and wherein, filled symbols are displayed in response to detection of a higher ambient brightness level than a previously detected ambient brightness level.

11. The device of claim 10, wherein the display unit is a head-up display or data glasses.

12. A transportation vehicle, wherein the transportation vehicle comprises a device of claim 10.

13. A non-transitory computer readable medium including a computer program, wherein the computer program includes instructions which, upon execution in a processing unit, displays a course of a trajectory in front of a transportation vehicle or an object to provide the functionality of the device of claim 10.

14. The device of claim 13, wherein types of precipitation such as rain, heavy rain, snow, hail, or fog are detected and analyzed as an environmental condition.

15. The device of claim 14, wherein grid points are represented using symbols having a shape which is differentiated from rain in response to detection of rain and/or heavy rain.

16. The device of claim 10, wherein, only the border of displayed symbols is displayed in response to detection of a lower ambient brightness level than the brightness level than a previously detected ambient brightness level.

* * * * *